United States Patent

[11] 3,592,164

| [72] | Inventor | Harold E. Schultze<br>Dayton, Ohio |
|---|---|---|
| [21] | Appl. No. | 812,108 |
| [22] | Filed | Apr. 1, 1969 |
| [45] | Patented | July 13, 1971 |
| [73] | Assignee | General Motors Corporation<br>Detroit, Mich. |

[54] SHOCK ABSORBER PISTON ROD SEAL ASSEMBLY WITH BELLEVILLE WASHER
1 Claim, 5 Drawing Figs.

[52] U.S. Cl. ............................................ 188/322
[51] Int. Cl. ............................................. F16f 9/36
[50] Field of Search ................................ 188/100;
277/90, 144

[56] References Cited
UNITED STATES PATENTS

| 2,644,701 | 7/1953 | Flick | 188/100 S UX |
| 2,880,022 | 3/1959 | Schultze | 188/100 S UX |
| 2,916,106 | 12/1959 | Duckett et al. | 188/100 (S) UX |

FOREIGN PATENTS

| 613,048 | 11/1960 | Italy | 188/100 (S) UX |

Primary Examiner—George E. A. Halvosa
Attorneys—Warren E. Finken and John C. Evans ABSTRACT: In preferred form, a direct acting hydraulic shock absorber having a frustoconically shaped piston rod seal biased by a Belleville washer spring against the outer surface of a piston rod to prevent hydraulic fluid leakage therebetween. The belleville washer spring is supported at its outer edge by a piston rod guide to cause its inner edge to bear against a loading ring having a conical end surface adjacent the conical end surface of the seal. The force of the loading ring on the seal radially biases the seal against the piston rod.

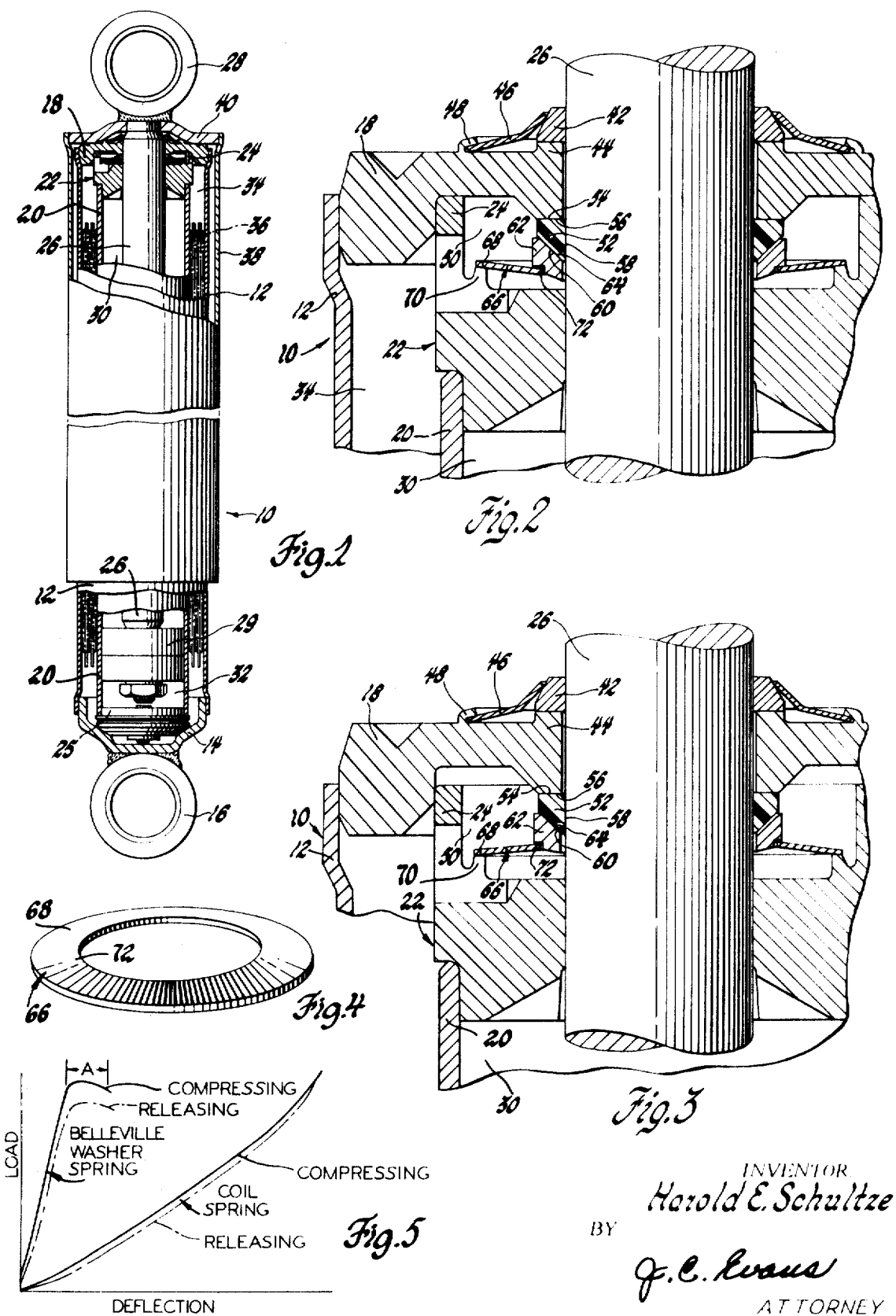

SHOCK ABSORBER PISTON ROD SEAL ASSEMBLY WITH BELLEVILLE WASHER

This invention relates to direct acting hydraulic shock absorber assemblies and, more particularly, to such assemblies wherein a piston rod seal is radially biased against a piston rod by a spring.

Prior direct acting hydraulic shock absorbers utilize coil springs to bias a piston rod seal against the piston rod. While the use of coil springs has generally been successful, certain disadvantages inherently exist. One disadvantage in using a coil spring in a shock absorber is its large axial displacement required in the shock absorber. In comparison, a relatively small axial displacement is occupied by the thin Belleville washer spring of the present invention. Since it is desirable to maximize the stroke of a shock absorber of a predetermined length, the shock absorber can be improved by utilizing the reduction in axial displacement of the piston rod seal assembly to increase the shock absorber stroke.

Another disadvantage in using a coil spring as seal biasing means within a shock absorber relates to its spring force characteristics. Coil springs exert a force which varies linearly in response to spring contraction. Thus as the piston rod seal of a prior art shock absorber is worn the coil spring expands and exerts an increasingly smaller force against the seal. The diminished spring force permits the escape of hydraulic fluid from the shock absorber which prematurely renders it useless. Since a Belleville washer spring exerts a substantially constant force over a sufficiently large deflection range, its use extends the life of the shock absorber.

An object of the present invention, therefore is to reduce the axial displacement of a piston rod seal assembly in a direct acting shock absorber and to thus maximize the shock absorber's stroke by the substitution of a Belleville washer spring for coil springs presently used for biasing the seal against the piston rod.

A further object is to utilize a Belleville washer spring in a direct acting hydraulic shock absorber to bias a piston rod seal against a piston rod which produces a constant force on the seal which is substantially independent of the spring's contraction and seal wear.

Further objects and advantages of the present invention will be apparent from the following description, reference being had to the accompanying drawings wherein a preferred embodiment of the present invention is clearly shown.

In the drawings:

FIG. 1 is a vertical view of a shock absorber partially sectioned to reveal the piston rod seal assembly;

FIG. 2 is an enlarged fragmentary view in vertical section of the piston rod seal assembly in its assembled form wherein the Belleville washer spring is in its normal stressed condition;

FIG. 3 is an enlarged, fragmentary view of the piston rod seal assembly showing the Belleville washer spring in its unstressed condition prior to the final assembly of the shock absorber;

FIG. 4 is an enlarged, perspective view of the Belleville washer in its unstressed condition; and FIG. 5 is a graph plotting the load verses deflection of a prior art coil spring and a Belleville washer spring.

In FIG. 1 of the drawings, a shock absorber 10 is illustrated. Assembly 10 includes an outer reservoir tube 12 which is attached at its lower end in a fluidtight manner to a circular cup shaped bottom end cap 14. A fitting 16 attached to the end cap 14 is adapted to secure the shock absorber assembly 10 to the unsprung mass of a vehicle.

The upper end of the reservoir tube 12 is enclosed by an end cap 18 which is connected by a fluidtight connection to the reservoir tube 12. Positioned concentrically within the reservoir tube 12 is a smaller diameter pressure cylinder tube 20. A piston rod guide 22 is supported within the upper end of pressure cylinder tube 20 and has an upwardly extending annular side 24 which contacts the surrounding top end cap 18 to coaxially position the pressure cylinder tube 20 relative to reservoir tube 12. Rod guide 22 is axially retained within the top end of tube 20 by the end cap 18.

The lower portion of pressure cylinder tube 20 is coaxially positioned relative to reservoir tube 12 by a base valve 25 which is held within the lower end of the pressure cylinder tube 20 by lower end cap 14. The design of the base valve forms no part of the present invention and may be of the type disclosed in U.S. Pat. No. 3,123,347 issued Mar. 3, 1964, to Stormer et al.

Concentrically located within pressure cylinder tube 20 and extending through axial bores within rod guide 22 and end cap 18 is a piston rod 26. The upper end of the piston rod 26 extends through end cap 18 and is secured to a fitting 28 exteriorly of the shock absorber 10. Fitting 28 is adapted to secure the shock absorber to the sprung mass of a vehicle. A valved piston 29 is attached to the lower end of piston rod 26 and is supported within pressure cylinder tube 20 for reciprocal movement therein. The design of the valved piston 29 is conventional and forms no part of the present invention. It may be of the type disclosed in U.S. Pat. No. 2,735,670 issued Feb. 21, 1956 to Schultze. Relative movement between the sprung mass and the unsprung mass of the vehicle causes the piston rod 26 and the attached piston 29 to reciprocate within the pressure cylinder tube 20.

A variable volume rebound chamber 30 is formed within the upper portion of pressure cylinder tube 20 between rod guide 22 and the reciprocal valved piston 29. A variable volume compression chamber 32 is formed within pressure cylinder tube 20 between the reciprocal valved piston 29 and the base valve 25. Both chambers 30 and 32 are completely filled with hydraulic fluid during normal operation of the shock absorber. Movement of valved piston 29 within pressure cylinder tube 20 toward the rod guide 22 necessarily decreases the volume of a rebound chamber 30. Likewise, movement of the valved piston 29 within pressure cylinder tube 20 toward base valve 25 decreases the volume of compression chamber 32. Valve elements within piston 29 regulate the flow of hydraulic fluid between chambers 30 and 32 caused by the reciprocation of the piston 29. The regulation of hydraulic fluid flow through piston 29 produces a predetermined dampening of relative movement between sprung and unsprung masses of the associated vehicle.

The movement of piston rod 26 into the pressure cylinder tube 20 during a compression stroke causes a decrease in compression chamber volume greater than the increase in rebound chamber volume. Likewise, reverse piston rod movement out of the pressure cylinder tube 20 during a rebound stroke causes an increase in compression chamber volume greater than the decrease in rebound chamber volume. The differential volume in either situation equals the volume of the piston rod 26 entering or exiting the rebound chamber 30. Because of this volumetric variance, a supplementary quantity of hydraulic fluid must be supplied to the compression chamber 32 upon movement of the piston 29 upward in pressure cylinder tube 20 and excess fluid must be removed from compression chamber 32 upon movement of the piston 29 downward in pressure cylinder tube 20. A hydraulic fluid reservoir chamber 34 located in the annular space between the reservoir tube 12 and the pressure cylinder tube 20 operates to supply fluid during the rebound stroke and to receive fluid during the compression stroke.

The base valve 25 is located between reservoir chamber 34 and compression chamber 32 to regulate the flow of hydraulic fluid therebetween. Valving components (not shown) within base valve 25 permit hydraulic fluid from the reservoir chamber 34 to enter the compression chamber 32 upon movement of piston 29 away from base valve 25. Other valving components (not shown) within base valve 25 permit hydraulic fluid from the compression chamber 32 to flow into the reservoir chamber 34 upon movement of the piston 29 downward in pressure cylinder tube 20.

It is apparent that the volume of fluid within reservoir chamber 34 varies considerably during reciprocation of the piston 29 within pressure cylinder tube 20. To accommodate this change of fluid volume within the reservoir chamber it is common to provide an air space within the reservoir chamber 34 above the fluid level. However, the pulsating flow of hydraulic fluid in the reservoir chamber 34 causes a high degree of fluid turbulence which causes the fluid to become undesirably aerated.

The subject shock absorber contains deformable gas cells 36 within reservoir chamber 34 to eliminate the need for an air space. As hydraulic fluid pulses in and out of the reservoir chamber 34, gas within the cells contracts and expands. The arrangement of a gas cell in a shock absorber reservoir is more fully disclosed and described in U.S. Pat. No. 2,997,291 issued Aug. 22, 1961.

A cylindrical dust shield 38 surrounds reservoir tube 12 and is attached at its upper edge to an end cover 40. End cover 40 is secured to the top end of piston rod 26 by welding or other suitable fastening means. Dust shield 38 and end cover 40 thus reciprocate with piston rod 26 to protect the upper portion of the shock absorber and to prevent the entrance of foreign material between piston rod 26 and end cap 18.

In addition to the protection afforded by dust shield 38 and end cover 40, an annular scraper ring 42 encircles piston rod 26 to prevent the entrance of foreign particles into the shock absorber between end cap 18 and piston rod 26. Scraper ring 42 rests upon upwardly protruding tabs 44 formed on end cap 18. Upward movement of the scraper ring 42 is prevented by a washer ring 46 which bears at its inner circumferential edge against scraper 42. The washer ring 46 is secured to end cap 18 by a spun over tab portion 48 which overlies the outer circumferential edge of the washer ring.

A Teflon piston rod seal 52 encircles the piston rod 26 and is supported within a hollow interior space 50 which is formed by the annular side 24 of rod guide 22. Seal 52 is of frustoconical shape having a flat end surface 54 which is adjacent a surface 56 of end cap 18. Piston rod 26 extends through an axially directed bore 58 in the seal 52 which forms a cylindrical wearable surface of the seal adapted to contact the piston rod to prevent fluid leakage therebetween. The seal 52 has another end surface 60 of nonplanar conical shape. Adjacent the end surface 60 and encircling piston rod 26 is an annular loading ring 62 having a conical end surface 64 abutting the conical end surface 60 of seal 52. Loading ring 62 is axially biased against the seal 52 by a Belleville washer spring 66 which is supported at its outer circumferential edge 68 by an upstanding annular tab 70 formed on rod guide 22. The inner circumferential edge 72 of the Belleville washer spring 66 contacts loading ring 62 to bias locking ring 62 axially against seal 52 when in the assembled position illustrated in FIG. 2.

The Belleville washer spring 66 in an unstressed condition is shown in FIG. 4. Spring 66 resembles a conventional washer but is nonplanar. The inner circumferential edge 72 of the spring washer 66 is elevated from the plane of the outer circumferential edge 68.

Prior to joining the reservoir tube 12 to the lower end cap 14 which completes the assembly of shock absorber 10, the undistorted Belleville washer spring 66 is seated on tab 70 as shown in FIG. 3. Downward movement of the end cap 18 over side 24 of rod guide 22 during the final assembly operation distorts the Belleville washer spring 66 into its stressed operating condition as illustrated in FIG. 2 which illustrates the distorted spring 66 having a concave surface facing the seal 52. This distortion causes the washer spring to exert an axial force upon loading ring 62. The loading ring 62 resolves this axial force of the washer spring into a radial compressive force on the seal 52 by the interaction between conical surface 64 of loading ring 62 and conical surface 60 of seal 52. The resultant compressive force of seal 52 on piston rod 26 helps prevent loss of hydraulic fluid from rebound chamber 30 upon movement of the piston rod 26 within pressure cylinder tube 20.

Utilization of a Belleville washer spring in place of a coil spring for biasing a piston rod seal against the piston decreases the axial dimensions of the seal assembly. This decrease may be used to desirably increase the stroke of the shock absorber or to make the shock absorber more compact. In one working embodiment of a shock absorber including the present invention the length of the piston rod seal assembly was shortened from 1.23 inches to 1.09 inches or a decrease in axial length of approximately 11 percent.

Another advantage of utilizing a Belleville washer spring in place of a coil spring is that the former exerts a substantially constant force upon the piston rod seal over a sufficiently wide range of deflection (region A in FIG. 5) to lessen the effect of seal wear. Coil springs on the other hand exert a force linearly proportional to deflection. FIG. 5 illustrates the spring characteristics of both types of springs. Thus the force exerted on a piston rod seal by a coil spring will decrease linearly with seal wear. A Belleville washer spring however will exert a substantially constant force upon the seal independently of seal wear.

While the embodiment of the present invention as herein described constitutes a preferred form, it is to be understood that other forms might be adapted.

I claim:

1. A direct acting hydraulic shock absorber comprising: a pressure cylinder tube; valved piston means concentrically supported within said pressure cylinder tube for the regulation of hydraulic fluid flow therethrough; a reservoir tube concentrically around said pressure cylinder tube; a piston rod attached to said piston means for reciprocating said piston means in said pressure cylinder tube; said piston rod extending axially outward from said pressure cylinder tube; a piston rod guide within one end of said pressure cylinder tube and around said piston rod for positioning said piston rod concentrically within said pressure cylinder tube; an end cap encircling said piston rod and spaced axially outward from said piston rod guide to form an annular space therebetween; an annular piston rod seal in said space having a wearable cylindrical surface adapted to sealingly contact said piston rod to prevent leakage of hydraulic fluid therebetween; said piston rod seal further having a flat end surface adapted to bear against said end cap; a conical end surface on the opposite end of said piston rod seal; an annular loading ring encircling and radially spaced from said piston rod and having a conical end surface adapted to contact said conical end surface of said piston rod seal for transforming axial forces on said loading ring into radial forces on said piston rod seal to maintain said wearable cylindrical seal surface against said piston rod; an annular washer shaped spring supported at its outer peripheral edge by said piston rod guide and contacting said loading ring at its inner peripheral edge; said annular washer spring having a non-planar configuration with its inner peripheral edge axially outward from its outer peripheral edge and said piston means when unstressed during assembly of said shock absorber prior to contact with said loading ring; said annular washer spring having a distorted configuration with its inner peripheral edge axially inward from its outer peripheral edge and said end cap when stressed after final assembly of said shock absorber whereby said stressed washer spring exerts a substantially constant axial force on said loading ring producing a constant radial force on said piston rod seal as said wearable cylindrical surface wears by frictional contact with said piston rod.